Figure 1:
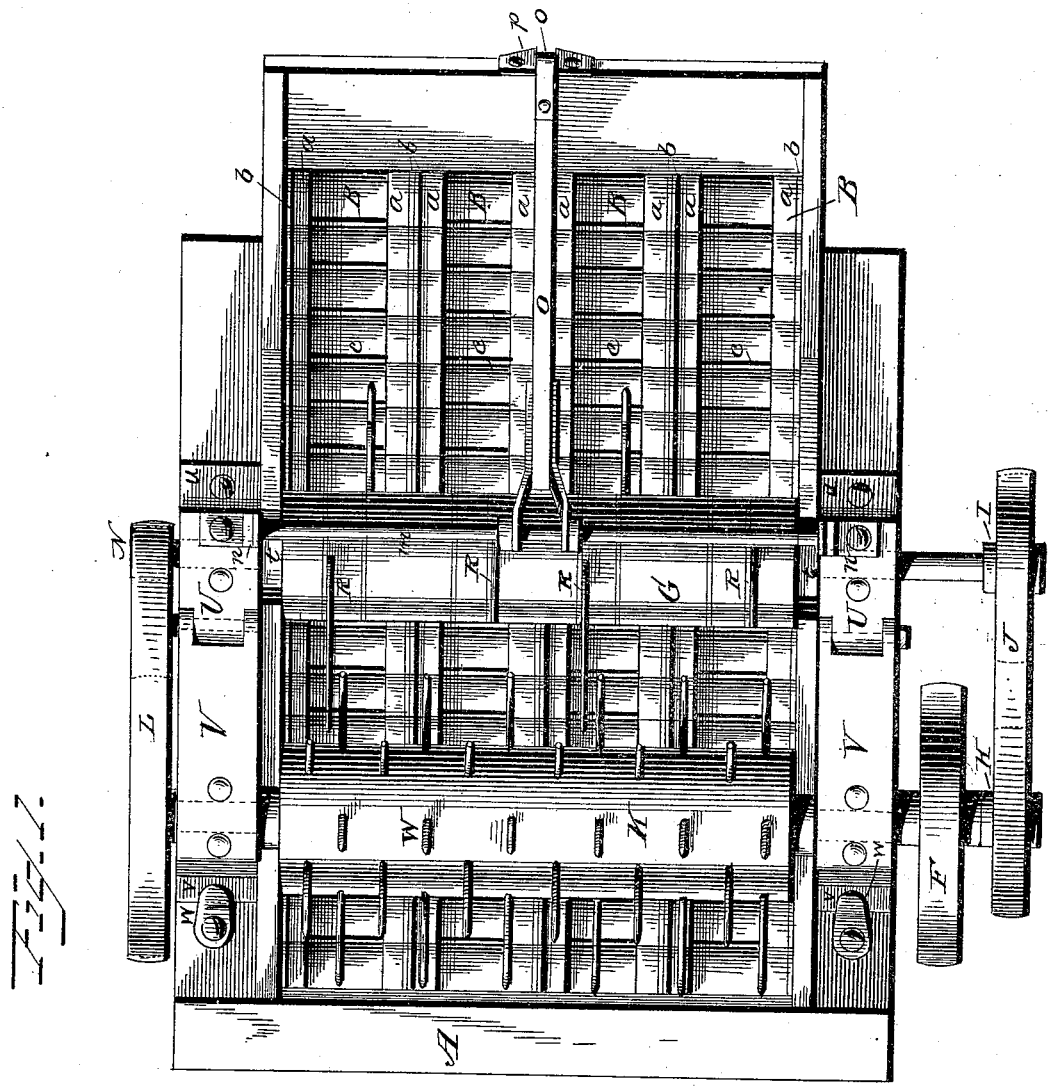

(No Model.) 3 Sheets—Sheet 1.

J. NERISON.
BAND CUTTER AND FEEDER FOR THRASHING MACHINES.

No. 515,356. Patented Feb. 27, 1894.

Witnesses:
C. J. Williamson,
Wm. D. Green.

Inventor
Jacob Nerison.
per Chas. H. Fowler
Attorney.

(No Model.) 3 Sheets—Sheet 2.

J. NERISON.
BAND CUTTER AND FEEDER FOR THRASHING MACHINES.

No. 515,356. Patented Feb. 27, 1894.

Witnesses
C. J. Williamson
Wm. B. Green.

Inventor
Jacob Nerison.
per Chas. N. Fowler
Attorney.

(No Model.) 3 Sheets—Sheet 3.

J. NERISON.
BAND CUTTER AND FEEDER FOR THRASHING MACHINES.

No. 515,356. Patented Feb. 27, 1894.

Witnesses
C. J. Williamson
Wm. B. Green.

Inventor
Jacob Nerison.
per Chas. H. Fowler
Attorney.

THE NATIONAL LITHOGRAPHING COMPANY,
WASHINGTON, D. C.

UNITED STATES PATENT OFFICE.

JACOB NERISON, OF BRUCE, MINNESOTA.

BAND-CUTTER AND FEEDER FOR THRASHING-MACHINES.

SPECIFICATION forming part of Letters Patent No. 515,356, dated February 27, 1894.

Application filed June 14, 1893. Serial No. 477,580. (No model.)

*To all whom it may concern:*

Be it known that I, JACOB NERISON, a citizen of the United States, residing at Bruce, in the county of Rock and State of Minnesota, have invented certain new and useful Improvements in Band-Cutters and Feeders for Thrashing-Machines; and I do hereby declare that the following is a full, clear, and exact description of the same, reference being had to the annexed drawings, making a part of this specification, and to the letters of reference marked thereon.

The present invention has relation to band-cutters and feeders for thrashing machines, and has for its object to provide an attachment of this character that will effectively and expeditiously sever the bands of the grain-sheaves and scattering and spreading the straw so that it can be reached and readily and effectually stripped of its grain, and improving the machine in the several details of construction whereby its value will be greatly enhanced and its operation rendered effective. These several objects I attain by the construction substantially as shown in the drawings and hereinafter described and claimed.

Figure 2:
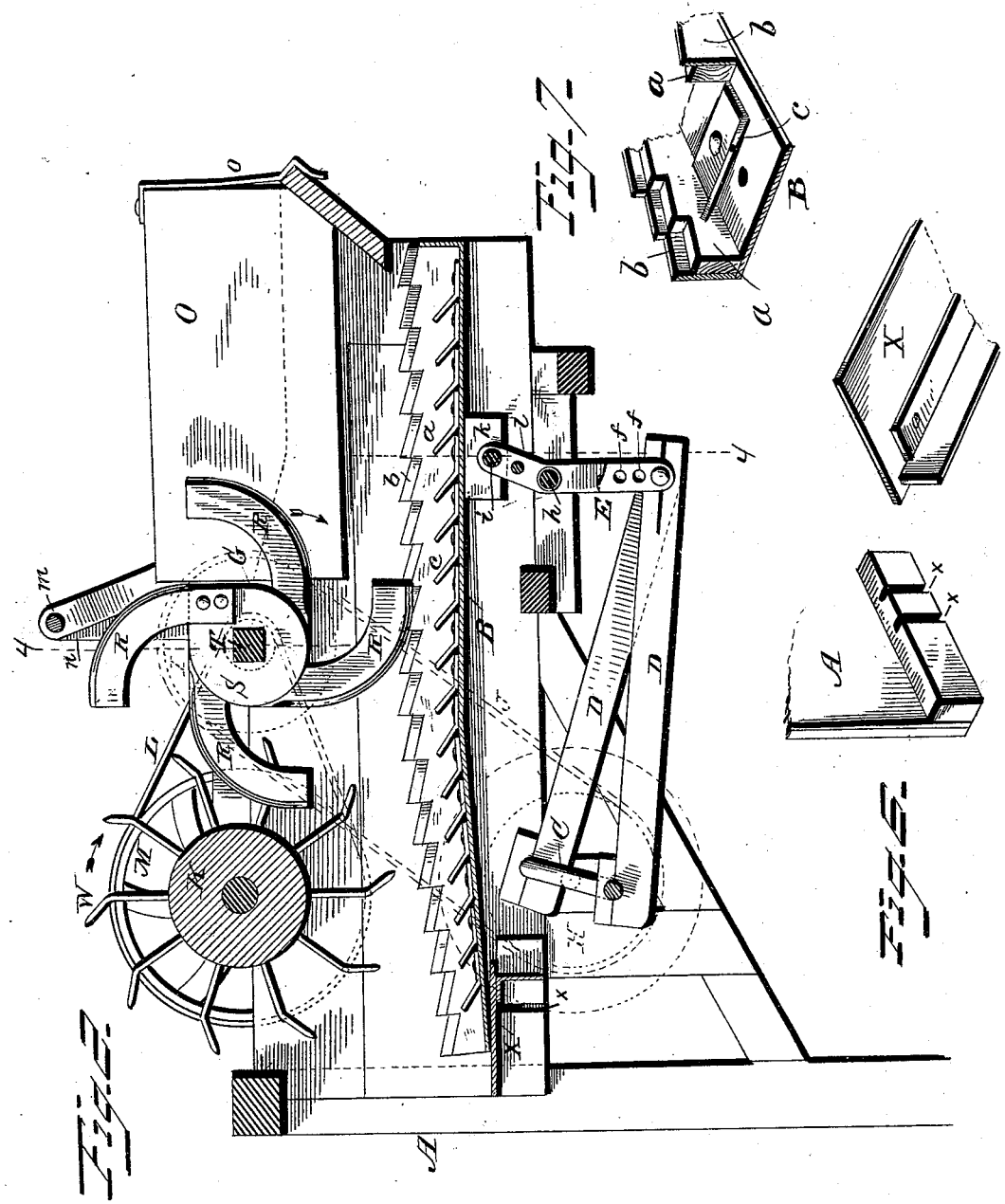
Figure 3:
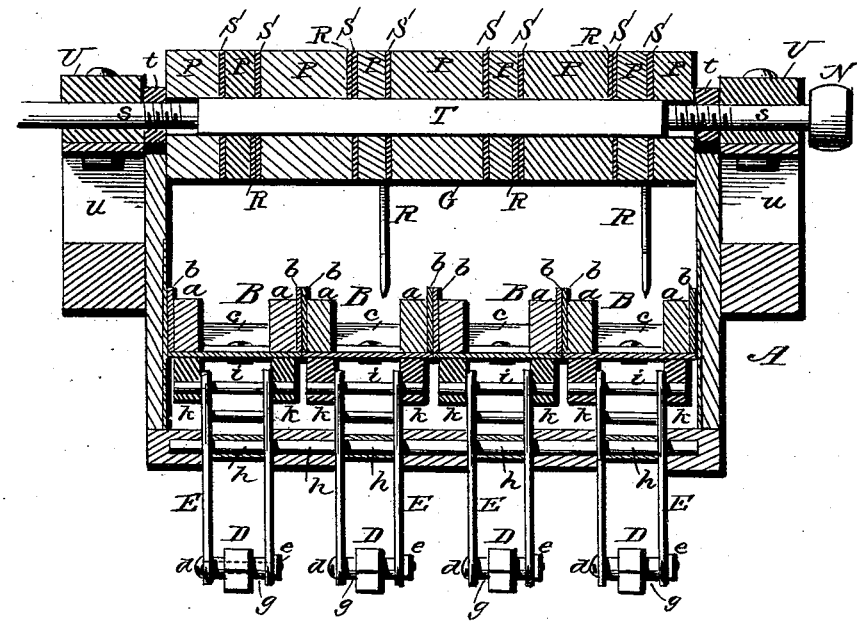
Figure 4:
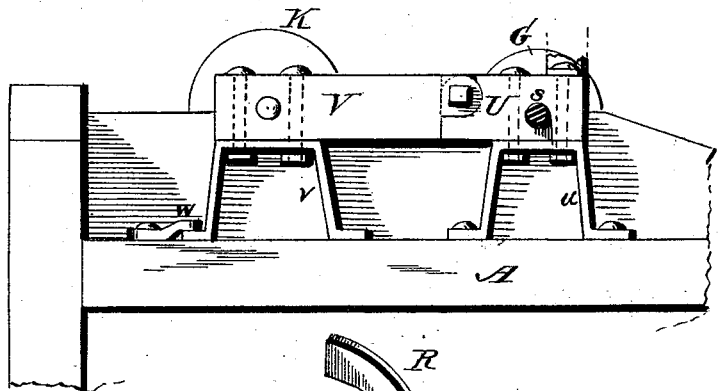
Figure 5:
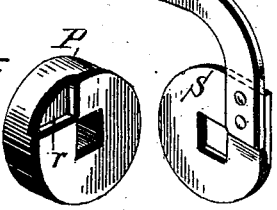

Figure 1 of the drawings represents a top plan view of my improved machine; Fig. 2 a longitudinal vertical section thereof; Fig. 3 a transverse vertical section through the cylinder which carries the knife-blades or band-cutters, on line 4 4 of Fig. 2; Fig. 4 a detail view of that portion of the frame of the machine to which the bearings for the journals of the cylinders are connected; Fig. 5 a detail view of one of the clamping-sections composing the knife cylinder and also one of the disks and knife-blade connected thereto; Fig. 6 a similar view of the support for the ends of the feed table sections and the side of the frame to which it is connected; Fig. 7 a detail view in perspective of the end of one of the feed-table sections.

In the accompanying drawings A represents the frame of the machine which may be of any suitable form and construction and is provided with a feed-table consisting of a plurality of reciprocating sections B. These sections have notched side-walls $a$ to the outer sides of which are suitably attached notched blades $b$ and between the walls of the sections are upwardly extending fingers $c$, which together facilitate the feeding of the grain and enable it to be more evenly distributed. The sections B have imparted to them a vibratory or reciprocating motion and alternately by means of a suitable crank and lever connections.

The compound crank-rod C has its bearing in suitable boxes upon the sides of the frame A or by any other well known and preferred manner. The cranks of the rod C have loosely connected to them suitable pitmen D and the pitmen are in turn connected with the feed-table sections B by means of yokes E which yokes are adjustably connected to the pitmen by means of the screw-bolts $d$ and nuts $e$ engaging with the screw threaded ends thereof, said bolts extending through holes $f$ in the yokes and through bearing sleeves $g$ rigidly connected to the ends of the pitmen. The yokes E are rigidly connected to bars or rods $h$ $i$ which rods at their projecting ends have loose bearings in the under side of the frame A and blocks $k$ upon the under side of the sections B respectively, as shown in Figs. 2 and 3. If preferred the rods $h$ may be in the form of a continuous rod having sleeves interposed between the sides of the yokes through which the rod passes as shown in Fig. 3, as I do not desire to confine myself to any specified manner of connecting the yokes to the frame and feed-table sections, as any suitable and well known means may be employed without departing from the principle of my invention.

The yokes E as will be seen have angular extensions or elbows $l$ so as to obtain a greater leverage power when the compound-crank C is in motion and giving a greater throw to the feed-table sections B.

Any suitable driving power may be employed for imparting motion to the crank rod C through the medium of the large pulley F over which passes a suitable belt, and connection is made between the crank-rod and cylinder G by means of the pulleys H I and belt J, and from cylinder G motion is imparted to the cylinder K through the medium of the belt L and pulleys M N on the respective shafts of the cylinders. The means shown for imparting motion to the cylinders may be changed or modified as found most preferable and any well known means may be employed to give to the feed-table sections the desired alternating, reciprocating or vibratory motion.

In adjusting the connection between the pitmen D and yokes E by means of the bolts and nuts so that the height of the pitmen will be changed with relation to the yokes, the machine can be made to feed more or less grain and feed faster or slower as the occasion requires, the extent and rapidity of motion of the feed-table sections being governed by such adjustment.

A partition-board O is provided which is suitably hinged to a transverse rod $m$, said rod having its ends supported in standards $n$ connected to the frame of the machine, or any other preferred means may be employed for hinging the partition-board. The board O at its free end has a spring latch $o$ which is adapted to engage with a keeper $p$ upon the frame of the machine to hold the board in an upright position so that the grain may be fed to the table upon either side thereof, and when desired to feed loose grain, the board is unlatched and thrown back out of the way, thus enabling the grain to be disposed much handier and with greater facility.

The cylinder G is composed of a plurality of clamping-sections P which have mortised seats $r$ to receive the heels of the cutting knives R, which knives are secured to metal disks S, as shown in Fig. 5. These disks are placed between the clamping sections with the heels of the knives in the mortised seats, and the several sections and disks passed over the flat sided shaft T which prevents them turning thereon, the clamping sections and disks having a central hole corresponding in form to that of the shaft. The shaft T terminates at its ends in journals $s$ which are screw threaded to receive jam-nuts $t$ so that in screwing the nuts tight up against the end clamping-sections the disks will be firmly clamped between them.

The manner of constructing the cylinder G enables the cutting knives to be arranged with relation to each other in any desirable manner, either to be brought in position to cut successively as shown, or disposed nearer to or farther from each other or arranged in various positions upon the cylinder, thus facilitating the cutting or severing of the bands of the grain-sheaves as they pass into the machine over the feeding-table. The jam-nuts may be provided with suitable keys or any well known means may be employed to prevent their turning on the journals when the cylinder is in motion.

The journals of the cylinder K are supported in bearing blocks V that are hinged at U' to blocks U that form the bearings of the cylinder G. The blocks U are mounted on brackets $u$ that are bolted to side bars of the frame A, while the free ends of the blocks V are supported from said side bars by brackets or feet $v$ that rest thereon and are held from accidentally rising by a pivoted button or latch $w$. Now when it is desired to raise the cylinder K for any purpose without the necessity of disengaging the belting, the latches $w$ are released and the bearings V are raised which carry with them the cylinder K, thus enabling access to be more conveniently had to the interior of the machine.

The cylinder K which may be constructed of metal or other suitable material, has curved teeth W, and is located behind the cylinder G, the teeth holding the bands and preventing them from being carried into the machine too rapidly and prevent the machine from clogging.

The sections B of the feeding-table have a double incline from their center, as shown in Fig. 2, so that the feeding of the grain will be materially facilitated and also in bringing the sheaves in close contact with the cutting knives so that the bands will be readily severed when brought under them. An adjustable support X is provided for the ends of the sections B of the feed-table, the support when changed being held in its adjusted position by means of the cleats $y$ engaging with the grooves $x$ in the bar or ledge $x'$ upon the sides of the frame, thus adapting the support to the throw of the feed-table sections. To adjust said support it is lifted from the ledge to disengage the cleat from one set of grooves and then placed back thereon with the cleat in another set of grooves $x$.

Having now fully described my invention, what I claim as new, and desire to secure by Letters Patent, is—

In combination the feed table composed of several reciprocating sections, the horizontally adjustable support on which the free ends of said sections rest, the pivoted yokes connected to the other ends of said sections, the compound crank rod and pitmen connecting the latter and the yokes, being adjustably attached to the latter, substantially as specified.

In testimony that I claim the above I have hereunto subscribed my name in the presence of two witnesses.

JACOB NERISON.

Witnesses:
  A. T. SEE,
  O. T. GILBERTSON.